United States Patent
Haruhara

(10) Patent No.: US 11,795,336 B2
(45) Date of Patent: Oct. 24, 2023

(54) OIL-BASED INK COMPOSITION FOR WRITING IMPLEMENTS

(71) Applicant: Mitsubishi Pencil Company, Limited, Tokyo (JP)

(72) Inventor: Yumiko Haruhara, Kanagawa (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 683 days.

(21) Appl. No.: 16/623,234

(22) PCT Filed: Mar. 12, 2018

(86) PCT No.: PCT/JP2018/009551
§ 371 (c)(1),
(2) Date: Dec. 16, 2019

(87) PCT Pub. No.: WO2019/003507
PCT Pub. Date: Jan. 3, 2019

(65) Prior Publication Data
US 2021/0147699 A1    May 20, 2021

(30) Foreign Application Priority Data
Jun. 29, 2017    (JP) .................... 2017-127613

(51) Int. Cl.
*C09D 11/17*    (2014.01)
*C08K 5/05*    (2006.01)
*C08L 27/18*    (2006.01)
*C08L 101/00*    (2006.01)

(52) U.S. Cl.
CPC ............... *C09D 11/17* (2013.01); *C08K 5/05* (2013.01); *C08L 27/18* (2013.01); *C08L 101/00* (2013.01); *C08K 2201/005* (2013.01); *C08L 2205/22* (2013.01)

(58) Field of Classification Search
CPC ......... C09D 11/16; C09D 11/17; C09D 11/18; C08K 5/05; C08K 2201/005; C08L 27/18; C08L 101/00; C08L 2205/22
USPC .......................................... 106/31.26, 31.27
See application file for complete search history.

(56) References Cited

U.S. PATENT DOCUMENTS

| | | |
|---|---|---|
| 2006/0063858 A1 | 3/2006 | Kang et al. |
| 2009/0255439 A1 * | 10/2009 | Ichikawa ................. B43K 7/00 106/31.61 |
| 2015/0044433 A1 | 2/2015 | Mao et al. |
| 2017/0058136 A1 | 3/2017 | Ueki et al. |
| 2018/0127609 A1 | 5/2018 | Nakamura |

FOREIGN PATENT DOCUMENTS

| | | | |
|---|---|---|---|
| DE | 19524442 A1 * | 1/1997 | ............. C09D 11/18 |
| JP | 05-339534 A | 12/1993 | |
| JP | 2000-109564 A | 4/2000 | |
| JP | 2000-109739 A | 4/2000 | |
| JP | 2003211597 A * | 7/2003 | |
| JP | 2005-157173 A | 6/2005 | |
| JP | 2010-196046 A | 9/2010 | |
| JP | 2011207011 A * | 10/2011 | |
| JP | 2012-116947 A | 6/2012 | |
| JP | 2017-008243 A | 1/2017 | |
| JP | 2017-048373 A | 3/2017 | |
| KR | 10-2006-0025102 A | 3/2006 | |
| TW | 201702323 A | 1/2017 | |

\* cited by examiner

*Primary Examiner* — Tri V Nguyen
(74) *Attorney, Agent, or Firm* — Foley & Lardner LLP

(57) ABSTRACT

This oil-based ink composition for writing implements contains a colorant, a resin, an organic solvent, and fluorine-based resin particles, the average particle size of the fluorine-based resin particles being at least 0.1 µm and less than 1.0 µm when measured by a dynamic light scattering method.

1 Claim, 2 Drawing Sheets

(a)

(b)

(c)

(a)

(b)

(c)

OIL-BASED INK COMPOSITION FOR WRITING IMPLEMENTS

CROSS-REFERENCE TO RELATED APPLICATIONS

This application is the U.S. National Stage of PCT/JP2018/009551, filed Mar. 12, 2018, which claims priority to JP 2017-127613, filed Jun. 29, 2017.

FIELD

The present invention relates to an oil-based ink composition for writing instruments.

BACKGROUND

Conventionally, oil-based ink compositions used in markers are required to have performance such as adhesion of written marks formed on writing surfaces of various materials, and light resistance that ensures color does not fade when exposed to sunlight for long periods of time. In particular, the oil-based inks are required to prepare written marks having sufficient adhesion even on materials with poor wettability, such as synthetic resin films, resin-coated paper, and metals.

In order to satisfy these requirements, PTL 1 discloses an invention related to an oil-based ink that can mark surfaces wet with water and a marking pen which can write on surfaces wet with water. In PTL 1, this oil-based ink contains either one or a mixture of two or more of acrylic resin particles, fluorine resin particles and fluorine resin modified ethylene resin particles with an average particle size of 1 to 15 μm as a fine polymer powder.

CITATION LIST

Patent Literature

[PTL 1] Japanese Unexamined Patent Publication (Kokai) No. 2010-196046

SUMMARY

Technical Problem

According to the oil-based ink composition for writing instruments of PTL 1, an oil-based ink in which the ink strongly adheres to a target, operability is high, and water resistance, weather resistance, and light resistance are good can be provided.

However, even when the above oil-based ink composition for writing instruments is used, the anti-rubbing characteristics of written marks deteriorate after enduring ultraviolet rays or the like, and as a result, peeling of the written marks sometimes occurs even with a light friction force.

Therefore, there is a need to provide an oil-based ink composition for writing instruments, wherein the oil-based ink composition can impart written marks with anti-rubbing characteristics which can endure repeated or forceful rubbing of marks formed on various materials and which are maintained after endurance.

Solution to Problem

As a result of keen evaluation and repeated experiments to achieve the above object, the present inventors discovered that the above object was achieved by the following means, thereby completing the invention. Basically, the present invention is as follows:

<1> An oil-based ink composition for writing instruments comprising a colorant, a resin, an organic solvent, and fluorine-based resin particles,
wherein the average particle size of the fluorine-based resin particles is in the range of 0.1 μm to less than 1.0 μm as measured by dynamic light scattering.

<2> The oil-based ink composition for writing instruments according to <1> above, wherein the content of the fluorine-based resin particles is 3 to 25 mass % based on the total mass of the oil-based ink composition for writing instruments.

<3> The oil-based ink composition for writing instruments according to <1> or <2> above, wherein the fluorine-based resin particles are fully fluorinated resin particles.

<4> The oil-based ink composition for writing instruments according to <3> above, wherein the fluorine-based resin particles are polytetrafluoroethylene particles.

<5> A writing instrument comprising at least an ink storage portion, a writing portion, and a holding portion,
wherein the oil-based ink compositions for writing instruments according to any one of <1> to <4> above is stored in the ink storage portion.

Advantageous Effects of Invention

According to the present invention, it is possible to provide an oil-based ink composition for writing instruments, wherein the oil-based ink composition can impart written marks with anti-rubbing characteristics which can endure repeated or forceful rubbing of marks formed on various materials and which are maintained after endurance.

BRIEF DESCRIPTION OF DRAWINGS

FIG. 2(a) is a schematic drawing of an oil-based ink layer formed from a conventional oil-based ink composition for writing instruments before applying a friction force. FIG. 2(b) is a schematic drawing of the oil-based ink layer formed from the conventional oil-based ink composition for writing instruments after applying a friction force.

DESCRIPTION OF EMBODIMENTS

<<Oil-Based Ink Composition for Writing Instruments>>

The oil-based ink composition for writing instruments of the present invention comprises a colorant, a resin, an organic solvent, and fluorine-based resin particles, wherein the average particle size of the fluorine-based resin particles is in the range of 0.1 μm to less than 1.0 μm as measured by dynamic light scattering.

As mentioned regarding PTL 1, an oil-based ink composition for writing instruments comprising fluorine-based resin particles with an average particle size of 1 to 15 μm reportedly enables the ink to strongly adhere to the target. In other words, conventionally, as a means of improving the adhesion of written marks, a means of including fluorine-based resin particles into ink to improve the wettability of an ink composition on a written surface and to thereby improve adhesion at the interface between the written surface and the ink composition was considered.

However, even when writing with an oil-based ink composition for writing instruments which comprises the fluorine-based resin particles, the adhesion of written marks after endurance was not always sufficient.

The present inventors found that this problem can be solved by using fluorine-based resin particles with an average particle size in the range of 0.1 μm to less than 1.0 μm. This is described with reference to FIGS. 1 and 2.

A conventional oil-based ink compositions for writing instruments improves the wettability of the ink composition on the writing surface and adhesion when this is written on a writing surface.

Additionally, when an oil-based ink composition for writing instruments comprising fluorine-based resin particles is applied to a substrate, and dried to form an oil-based ink layer (10) as a written mark, as shown in FIG. 2(a), fluorine-based resin particles (12) are exposed on the surface of the oil-based ink layer (10), thereby the coefficient of friction of the surface of the oil-based ink layer (10) is reduced, and as a result, the anti-rubbing characteristics of the written marks improve.

However, it is considered that when this oil-based ink layer (10) endures ultraviolet rays or the like, an adhered component (14) exposed on the surface of the oil-based ink layer (10) degrades due to the energy of ultraviolet rays. As a result, if a friction force is applied in the direction of the arrow shown in FIG. 2(a), the adhered component (14) sometimes becomes physically detached, as shown in FIG. 2(b). As a result, if a further friction force is applied, the entirety of the oil-based ink layer (10) could be removed from the writing surface (20), as shown in FIG. 2(c).

Figure 1:
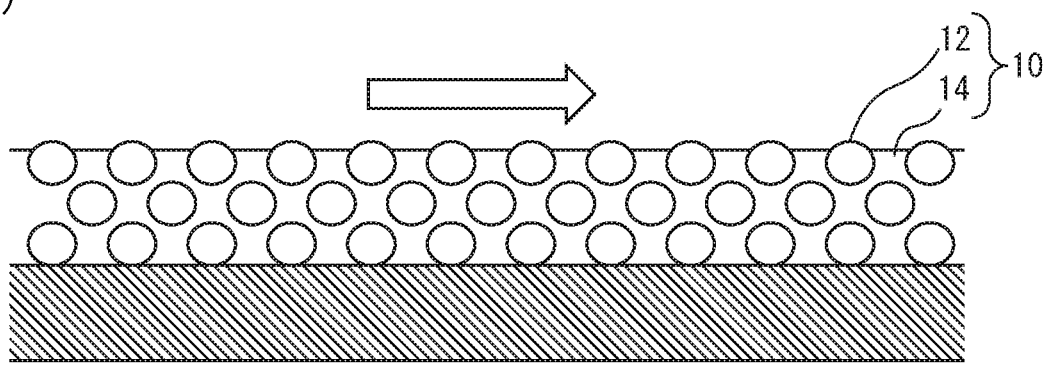
FIG. 1(a) is a schematic drawing of an oil-based ink layer formed from the oil-based ink composition for writing instruments of the present invention before applying a friction force.
FIG. 1(b) is a schematic drawing of the oil-based ink layer formed from the oil-based ink composition for writing instruments of the present invention after applying a friction force.
FIG. 1(c) is a schematic diagram of the oil-based ink layer formed from the oil-based ink composition for writing instruments of the present invention after further applying a friction force.
Figure 1:
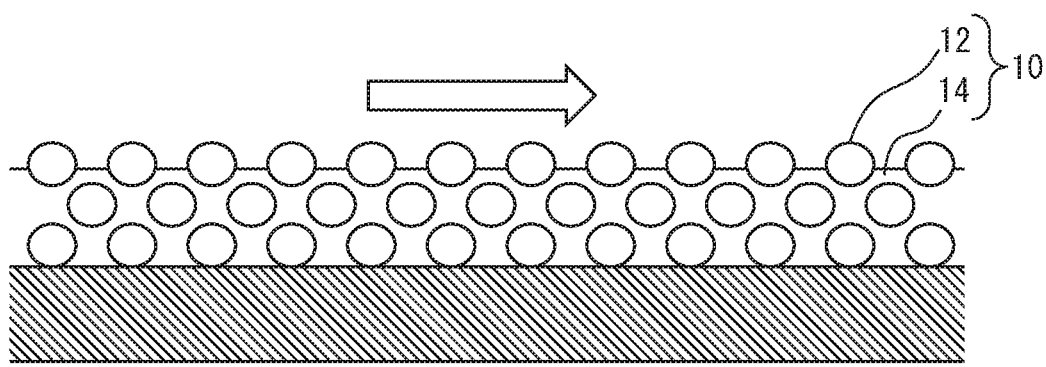
Figure 1:
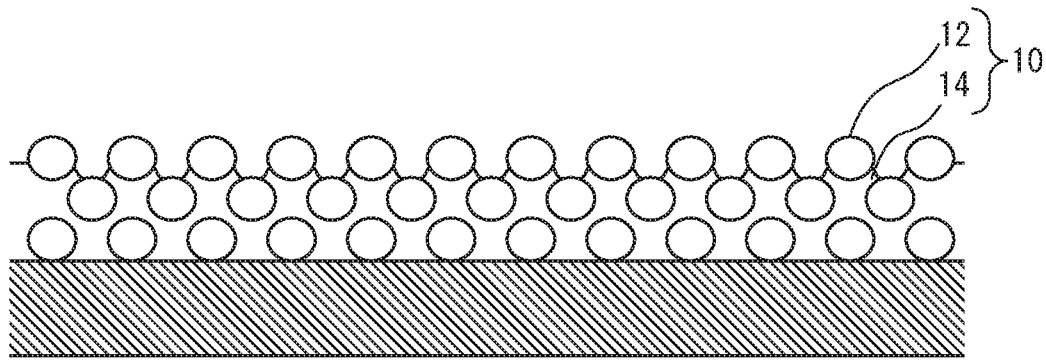
Figure 2:
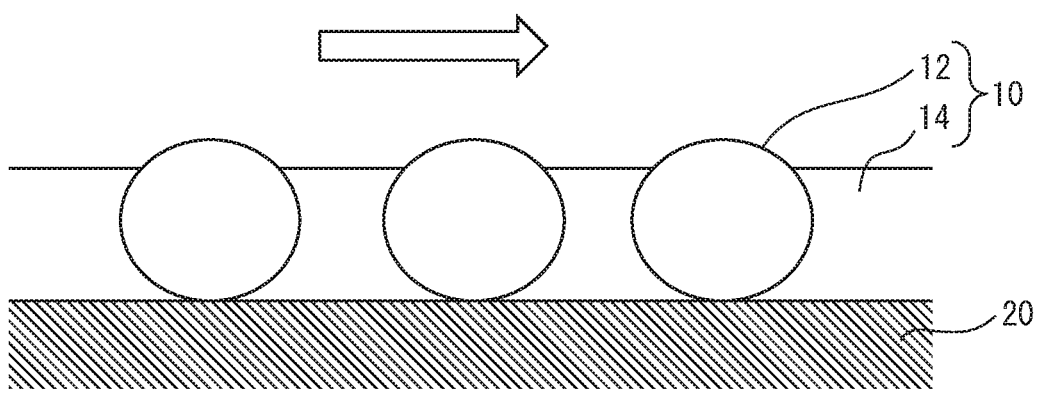
FIG. 2 (c) is a schematic drawing of the oil-based ink layer formed from the conventional oil-based ink composition after further applying a friction force.
Figure 2:
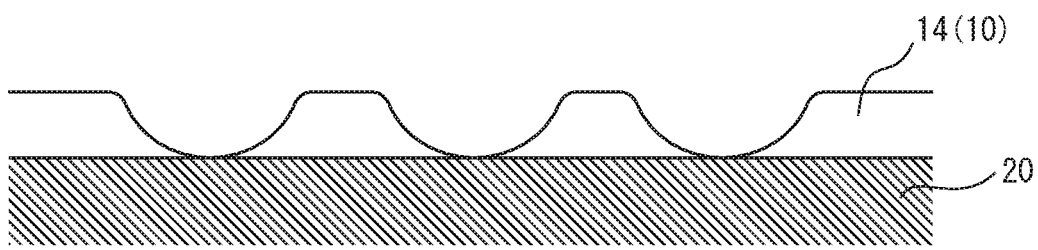
Figure 2:

In contrast, when the oil-based ink composition for writing instruments of the present invention is applied to a substrate, and dried to form an oil-based ink layer (10) as shown in FIG. 1 (a), the average particle size of the fluorine-based resin particles (12) is small, such that the surface area of an adhered component (14) portion exposed on the surface can be decreased.

Additionally, it is considered that, since the average particle size of fluorine-based resin particles (12) is small, the fluorine-based resin particles (12) disperse, forming layers in the thickness direction of the oil-based ink layer (10). As a result, even when the adhered component (14) in a surface region is degraded and removed, fluorine-based resin particles in a lower layer of the layers are exposed, and wear resistance of the written marks is maintained.

Therefore, it is considered that, after endurance, if a friction force is applied in the direction of the arrow in FIG. 1(a), the adhered component (14) is less likely to become physically detached, and even if it does become detached, as shown in FIG. 1(b), only the adhered component (14) exposed on the surface of the oil-based ink layer (10) is physically detached. As a result, even if a further friction force is applied, as shown in FIG. 1(c), fluorine-based resin particles (12) present in the interior of the oil-based ink layer are newly exposed such that the wear resistance of the marks is maintained.

According to the above configuration, it is possible to obtain an oil-based ink composition for writing instruments in which written marks formed by writing on various materials have anti-rubbing characteristics which endure repeated or forceful rubbing due to the presence of fluorine-based resin particles, and written marks can be imparted with anti-rubbing characteristics which are maintained even after endurance due to the small average particle size of fluorine-based resin particles.

The content of fluorine-based resin particles in the oil-based ink composition for writing instruments of the present invention is preferably 3 mass % or more, 4 mass % or more, or 5 mass % or more from the perspective of including sufficient fluorine-based resin particles in the written marks and thereby improving the anti-rubbing characteristics of written marks, and 25 mass % or less, 22 mass % or less, or 20 mass % or less from the perspective of obtaining adhesion between the oil-based ink composition for writing instruments of the present invention and the writing surface.

The content of colorant of the oil-based ink composition for writing instruments of the present invention can be 1 mass % or more, 2 mass % or more, 3 mass % or more, or 5 mass % or more, and 25 mass % or less, 20 mass % or less, or 15 mass % or less.

The content of resin in the oil-based ink composition for writing instruments of the present invention can be 0.1 mass % or more, 0.3 mass % or more, 0.5 mass % or more, 1 mass % or more, 2 mass % or more, 3 mass % or more, or 5 mass % or more, and 25 mass % or less, 20 mass % or less, or 15 mass % or less.

Each of the components of the present invention will be explained below.

<Colorant>

The colorant may be any of various colorants conventionally used in inks, such as a dye, a pigment, or a mixture of a dye and a pigment.

The dye that can be used in the present invention can be any of dyes used in normal dye ink compositions, such as a direct dye, an acidic dye, a basic dye, a mordant/acid mordant dye, a spirit soluble dye, an azoic dye, a sulfur/sulfur vat dye, a vat dye, a disperse dye, an oil-soluble dye, a food dye, a metal complex dye, a salt-forming dye, a dye of dyed resin or solutions thereof.

The pigment that can be used in the present invention can be an inorganic pigment such as carbon black, graphite, or a titanium dioxide pigment; a constitutional pigment such as talc, silica, alumina, mica, or alumina silicate; an organic pigment such as an azo pigment, a condensed azo pigment, a phthalocyanine pigment, an anthraquinone pigment, a quinacdrine pigment, an isoindolinone pigment, a diketopyrrolopyrrole pigment, or any of various lake pigments; a fluorescent pigment; a pearl pigment; or a metallic pigment such as a gold or silver metallic pigment.

One or a mixture of the above dyes and pigments can be used as the colorant in the present invention.

<Resin>

The resin can be a ketone resin, sulfoamide resin, maleic acid resin, terpene resin, terpene phenol resin, ester gum, xylene resin, alkyd resin, phenol resin, butyral resin, rosin, polyvinyl pyrrolidone, polyvinyl alcohol, acrylic resin, melamine resin, cellulose resin, or a derivative thereof. One or a mixture of the above resins can be used.

In particular, when the fluorine-based resin particles are polytetrafluoroethylene (PTFE) particles, it is preferable that the resin comprise at least a butyral resin from the perspective of achieving good dispersion of the polytetrafluoroethylene (PTFE) particles. In such a case, the mass ratio of the butyral resin to the polytetrafluoroethylene (PTFE) particles can be 0.01 or more, 0.03 or more, or 0.05 or more, and can be 0.3 or less, 0.2 or less, or 0.1 or less.

<Organic Solvent>

The organic solvent can be, for example, an aromatic compound, an alcohol, a polyalcohol, a glycol ether, a hydrocarbon, or an ester. The above solvents can be used individually or in combination.

The aromatic compound can be, for example, benzyl alcohol, ethylene glycol monophenyl ether, ethylene glycol monobenzyl ether, propylene glycol monophenyl ether, diethylene glycol monophenyl ether, alkyl sulfonic acid phenyl ester, butyl phthalate, ethyl hexyl phthalate, tridecyl phthalate, ethyl hexyl trimellirate, diethylene glycol dibenzoate, or dipropylene glycol dibenzoate, etc.

The alcohol can be, for example, ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methyl amyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, or 2-methylcyclohexanol, etc.

The polyalcohol can be, for example, ethylene glycol, diethylene glycol, 3-methyl-1,3-butanediol, triethylene glycol, dipropylene glycol, 1,3-propanediol, 1,3-butanediol, 1,5-pentanediol, hexylene glycol, or octylene glycol, etc.

The glycol ether can be, for example, methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol mono-2-ethylbutyl ether, ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol tertiary butyl ether dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, or tetrapropylene glycol monobutyl ether, etc.

The hydrocarbon can be, for example, a linear hydrocarbon such as hexane, isohexane, heptane, octane, nonane, or decane, or a cyclic hydrocarbon such as cyclohexane, methylcyclohexane, or ethylcyclohexane.

The ester can be, for example, propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethyl acetate, ethyl trimethyl acetate, propyl trimethyl acetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributyl acetate citrate, octyl oxystearate, propylene glycol monoricinoleate, methyl 2-hydroxyisobutyrate, or 3-methoxybutyl acetate, etc.

<Fluorine-Based Resin Particles>

The fluorine-based resin particles are composed of a polymer obtained by polymerizing fluorine-containing monomers. In particular, the fluorine-based resin particles in the oil-based ink composition for writing instruments of the present invention have an average particle size in the range of 0.1 μm to less than 1.0 μm as measured by dynamic light scattering. The average particle size measured according to dynamic light scattering refers to the value of the average particle size calculated by a Fiber-Optics Particle Analyzer FPAR-1000 (Otsuka Electronics Co., Ltd.) using cumulant method analysis of a scattering intensity distribution.

It is preferable that the average particle size be 0.1 μm or more, 0.2 μm or more, or 0.3 μm or more from the perspective of facilitating the exposure of the fluorine-based resin particles on the surface of the written marks and thereby improving anti-rubbing characteristics of written marks. Additionally, it is preferable that the average particle size be less than 1.0 μm, 0.9 μm or less, or 0.8 μm or less from the perspective of reducing an influence of endurance to ultraviolet light or the like on the written marks and thereby maintaining anti-rubbing characteristics of written marks after endurance.

The fluorine-based resin particles may be fully fluorinated resin particles, partially fluorinated resin particles or fluorinated resin-olefin copolymer particles. In particular, using fully fluorinated resin particles is preferable from the perspective of reducing the coefficient of friction of the surface of the written marks and thereby improving the anti-rubbing characteristics of the written marks.

The fully fluorinated resin particles may be, for example, polytetrafluoroethylene (PTFE) particles, perfluoroalkoxyalkane (PFA) particles, or tetrafluoroethylene-hexafluoropropylene copolymer (FEP) particles, and is preferably PTFE from the perspectives of chemical stability, cost, and the like.

The partially fluorinated resin particles may be polyvinylidene fluoride (PVDF) particles, or polychlorotrifluoroethylene (PCTFE) particles.

The fluorinated resin-olefin copolymer particles are copolymer particles of fully fluorinated resin and/or partially fluorinated resin and olefin, for example, tetrafluoroethylene-ethylene copolymer (ETFE) particles, or chlorotrifluoroethylene-ethylene copolymer (ECTFE) particles.

<Other Components>

The oil-based ink composition for writing instruments of the present invention may include other optional components. The other components may be, for example, a leveling agent, rust inhibitor, preservative, lubricant, or resin.

The leveling agent may be, for example, a fluorine-based surfactant, silicone oil, or phosphate ester surfactant.

<<Writing Instrument>>

The writing instrument of the present invention comprises at least an ink storage portion, a writing portion, and a holding portion. The above oil-based ink composition for writing instruments is stored in the ink storage portion. The writing instrument of the present invention may be a marking pen, or a ballpoint pen.

"Marking pen" in the present specification refers to a pen having a structure that supplies ink stored in the ink storage portion to a writing portion made of a resin via capillary action, and encompasses pens referred to as "permanent markers" in the art. Additionally, "ballpoint pen" in the present specification refers to a pen having a structure in which rotation of a ball in the writing portion results in discharge of the ink stored in the ink storage portion.

<Ink Storage Portion>

The oil-based ink composition for writing instruments is stored in the ink storage portion.

The ink storage portion may be anything that can store ink and can supply the ink to the writing portion.

<Writing Portion>

The writing portion may comprise any materials in accordance with the use of the writing instrument. In the case of the present invention, in which the writing instrument is a permanent marker, the writing portion can be, for example, a fiber core or a plastic core. In the case where the writing instrument of the present invention is a ballpoint pen, the writing portion may comprise a ballpoint pen tip at the tip portion thereof <<Method for Manufacturing an Oil-Based Ink Composition for Writing Instruments>>

The oil-based ink composition for writing instruments can be manufactured using a conventionally known method while mixing the colorant, resin, organic solvent, and fluorine-based resin particles using a mixer such as a Disper.

EXAMPLES

The present invention will be specifically described by way of the Examples and Comparative Examples. However, the present invention is not limited thereto.

<<Preparing the Oil-Based Ink Composition for Writing Instruments>>

Example 1

Fluorine-based resin particles A (Algoflon L203F, Solvay, average particle size 0.3 μm, 12 mass parts) and a butyral resin (S-Lec BL-10, Sekisui Chemical Co., Ltd., 0.6 mass parts) as a resin B, ethanol (52.2 mass parts) as a solvent, and propylene glycol monoethyl ether (17.5 mass parts) were mixed by stirring and dispersed. Thereafter, a dye (Valifast Black 3830, Orient Chemical Co., Ltd., 12.5 mass parts) as a colorant, terpene phenol (YS Polystar S145, Yasuhara Chemical Co., Ltd., 5 mass parts) as a resin A, and a fluorine-based surfactant (Surflon S-243, AGC Seimi Chemical Co., Ltd., 0.2 mass parts) as a leveling agent were mixed therein to prepare 100 mass parts of the oil-based ink composition for writing instruments of Example 1.

Example 2

100 mass parts of the oil-based ink composition for writing instruments of Example 2 were prepared in the same manner as in Example 1, except that the dye as a colorant was changed to Spilon Red C-GH (Hodogaya Chemical Co., Ltd., 3.5 mass parts), fluorine-based resin particles A was changed to fluorine-based resin particles B (Dyneon TF micropowder 9201Z, 3M Company, average particle size 0.15 μm, 6 mass parts), the leveling agent was changed to silicone oil (KF0004, Shin-Etsu Silicone Co., Ltd., 1 mass part), and the mass parts of butyral resin, ethanol, and propylene glycol monoethyl ether were changed to 0.3 mass parts, 62.7 mass parts, and 21.5 mass parts, respectively.

Example 3

100 mass parts of the oil-based ink composition for writing instruments of Example 3 were prepared in the same manner as in Example 1, except that the dye used as a colorant was changed to Valifast Blue 1613 (Orient Chemical Co., Ltd., 7.5 mass parts), fluorine-based resin particles A was changed to fluorine-based resin particles C (KTL-500F, Kitamura Limited, average particle size: 0.75 μm, 18 mass parts), and the mass parts of butyral resin, ethanol, and propylene glycol monoethyl ether were changed to 0.9 mass parts, 51.4 mass parts, and 17 mass parts, respectively.

Example 4

100 mass parts of the oil-based ink composition for writing instruments of Example 4 were prepared in the same manner as in Example 1, except that the content of fluorine-based resin particles was changed to 3 mass parts, the leveling agent was changed to silicone oil (KF0004, Shin-Etsu Silicone Co., Ltd., 1 mass part), and the mass parts of butyral resin, ethanol, and propylene glycol monoethyl ether were changed to 0.15 mass parts, 58.85 mass parts, and 19.5 mass parts, respectively.

Example 5

100 mass parts of the oil-based ink composition for writing instruments of Example 5 were prepared in the same manner as in Example 1, except that the content of fluorine-based resin particles was changed to 25 mass parts, and the mass parts of butyral resin, ethanol, and propylene glycol monoethyl ether were changed to 1.25 mass parts, 41.55 mass parts, and 14.5 mass parts, respectively.

Comparative Example 1

100 mass parts of the oil-based ink composition for writing instruments of Comparative Example 1 were prepared in the same manner as in Example 1, except that fluorine-based resin particles A and butyral resin were not used, and the mass parts of ethanol and propylene glycol monoethyl ether were changed to 62.8 mass parts and 19.5 mass parts, respectively.

Comparative Example 2

100 mass parts of the oil-based ink composition for writing instruments of Comparative Example 2 were prepared in the same manner as in Example 2, except that fluorine-based resin particles B and butyral resin were not used, and the mass parts of ethanol and propylene glycol monoethyl ether were changed to 68 mass parts and 22.5 mass parts, respectively.

Comparative Example 3

100 mass parts of the oil-based ink composition for writing instruments of Comparative Example 3 were prepared in the same manner as in Example 3, except that the fluorine-based resin particles C were changed to fluorine-based resin particles D (18 mass parts), and the mass parts of ethanol and propylene glycol monoethyl ether were changed to 51.6 mass parts and 16.8 mass parts respectively.

<<Preparing the Writing Instrument>>

The above oil-based ink compositions for writing instruments were filled into Mitsubishi Pencils PA-121T (product name "Pi:s Marker", pen core: fine round core (acrylic fiber core)) to prepare marking pens. Thereafter, the anti-rubbing characteristics and anti-UV rubbing characteristics thereof using a fine round core were evaluated.

<Anti-Rubbing Characteristics>

Using the marker prepared, written marks were written on a polypropylene (PP) film, glass, and polytetrafluoroethylene (PTFE), and then dried. The written marks were rubbed by moving thereon Kimwipes paper loaded with a 500 g weight five times to evaluate anti-rubbing characteristics.

The evaluation criteria are as follows:

Excellent: The marks were not removed at all upon inspection after the test.

Good: The marks were slightly removed, but mostly remained present upon inspection after the test.

Poor: The marks were almost completely removed upon inspection after the test.

<Anti-Rubbing Characteristics after Endurance>

Dried written marks were irradiated for 200 hours with ultraviolet rays using a xenon fade meter X25F (FLR 40SW/M36, Suga Test Instruments Co., Ltd.) pursuant to JIS S 6037-2006 and then evaluated for anti-rubbing characteristics in the same manner as above to evaluate the anti-rubbing characteristics of the written marks after endurance.

Results are shown in Table 1.

TABLE 1

| | | | Example 1 | Example 2 | Example 3 | Example 4 | Example 5 | Comparative Example 1 | Comparative Example 2 | Comparative Example 3 |
|---|---|---|---|---|---|---|---|---|---|---|
| Composition | Content (mass parts) | Colorant (type) | 12.5(A) | 3.5(B) | 7.5(C) | 12.5(A) | 12.5(A) | 12.5(A) | 3.5(B) | 7.5(C) |
| | | Resin A | 5 | 5 | 5 | 5 | 5 | 5 | 5 | 5 |
| | | Resin B | 0.6 | 0.3 | 0.9 | 0.15 | 1.25 | 0 | 0 | 0.9 |
| | | Fluorine-based resin particle | 12 | 6 | 18 | 3 | 25 | 0 | 0 | 18 |
| | | Fluorine-based surfactant | 0.2 | 0 | 0.2 | 0 | 0.2 | 0.2 | 0 | 0.2 |
| | | Silicone oil | 0 | 1 | 0 | 1 | 0 | 0 | 1 | 0 |
| | | Ethanol | 52.2 | 62.7 | 51.4 | 58.85 | 41.55 | 62.8 | 68 | 51.6 |
| | | PGM | 17.5 | 21.5 | 17 | 19.5 | 14.5 | 19.5 | 22.5 | 16.8 |
| | Details of fluorene-based resin particles | Type | A | B | C | A | A | — | — | D |
| | | Average particle size (μm) | 0.3 | 0.15 | 0.75 | 0.3 | 0.3 | — | — | 4.0 |
| Results | Anti-rubbing characteristics | PP | Excellent | Excellent | Excellent | Excellent | Excellent | Good | Good | Excellent |
| | | Glass | Excellent | Excellent | Excellent | Excellent | Excellent | Good | Good | Excellent |
| | | PTFE | Excellent | Excellent | Excellent | Excellent | Excellent | Poor | Poor | Excellent |
| | Anti-rubbing characteristics after endurance | PP | Excellent | Excellent | Excellent | Good | Excellent | Poor | Poor | Poor |
| | | Glass | Excellent | Excellent | Excellent | Good | Excellent | Poor | Poor | Poor |
| | | PTFE | Excellent | Excellent | Excellent | Good | Excellent | Poor | Poor | Poor |

Colorant A: Black dye (Valifast Black 3830, Orient Chemical Co., Ltd.)
Colorant B: Red dye (Spilon Red C-GH, Hodogaya Chemical Co., Ltd.)
Colorant C: Blue dye (Valifast Blue 1613, Orient Chemical Co., Ltd.)
Resin A: YS Polystar S145 (Yasuhara Chemical Co., Ltd.)
Resin B: S-Lec BL-10(Sekisui Chemical Co., Ltd.)
Fluorine-based resin particles A: Algoflon L203, Solvay, average particle size 0.3 μm
Fluorine-based resin particles B: Dyneon TF micropowder 9201Z, 3M Company, average particle size 0.15 μm
Fluorine-based resin particles C: KTL-500F, Kitamura Limited, average particle size 0.75 μm
Fluorine-based resin particles D: KTL-8N, Kitamura Limited, average particle size 4.0 μm From Table 1, it can be understood that written marks formed from the oil-based ink compositions for writing instruments of Examples 1 to 5, which comprised fluorine-based resin particles with an average particle size in the range of 0.1 μm to less than 1.0 μm, had better anti-rubbing characteristics before and after endurance than those formed from the oil-based ink compositions for writing instruments of Comparative Examples 1 and 2, which did not comprise fluorine-based resin particles. Additionally, it can be understood that written marks formed from the oil-based ink compositions for writing instruments of Examples 1 to 5 had better anti-rubbing characteristics after endurance than those formed from the oil-based ink composition for writing instruments of Comparative Example 3, which comprised fluorine-based resin particles with an average particle size of over 1.0 μm.

REFERENCE SIGNS LIST

10 oil-based ink layer
12 fluorene-base resin particle
14 adhered components
20 writing surface

The invention claimed is:

1. A marking pen or a ballpoint pen comprising at least an ink storage portion, a writing portion, a holding portion, and an oil-based ink composition, wherein the oil-based ink composition is stored in the ink storage portion, said oil-based ink composition comprising a colorant, a resin, an organic solvent, and a powder of polytetrafluoroethylene particles having a melting temperature from 325° C. to 335° C.,
   wherein the average particle size of the powder of polytetrafluoroethylene particles is in the range of 0.1 μm to less than 1.0 μm as measured by dynamic light scattering, and wherein the content of the powder of polytetrafluoroethylene particles is 3 to 25 mass % based on the total mass of the oil-based ink composition.

* * * * *